United States Patent [19]

Marusak

[11] Patent Number: 4,468,882
[45] Date of Patent: Sep. 4, 1984

[54] FISH HOOK HOLDER

[76] Inventor: Stephen A. Marusak, 537 E. Oak Ridge Ave., New Port Richey, Fla. 33552

[21] Appl. No.: 431,841

[22] Filed: Sep. 30, 1982

[51] Int. Cl.³ .............................................. A01K 97/00
[52] U.S. Cl. .................................. 43/57.1; 206/315.11
[58] Field of Search ...................... 43/57.1, 54.5, 57.2; 206/22, 315, DIG. 15; 220/493, 315 R

[56] References Cited

U.S. PATENT DOCUMENTS

| 81,346 | 6/1830 | Myers | 43/54.1 |
|---|---|---|---|
| 219,973 | 2/1871 | Sather | 43/57.1 |
| 2,703,467 | 3/1955 | Shepherd | 43/57.1 |
| 2,783,536 | 3/1957 | McQueary | 224/245 |
| 2,800,263 | 7/1957 | Hunt | 224/103 |
| 2,932,118 | 4/1960 | Jend | 43/57.1 |
| 3,430,379 | 3/1969 | Wolfrum | 43/57.1 |
| 3,800,456 | 4/1974 | Rowe | 43/57.1 |
| 3,940,873 | 3/1976 | Lawless | 43/57.1 |
| 4,015,361 | 4/1977 | O'Reilly et al. | 43/57.1 |
| 4,081,116 | 3/1978 | Fliegelman et al. | 43/57.1 |
| 4,208,825 | 6/1980 | Barnes | 43/57.1 |

Primary Examiner—Willie G. Abercrombie
Assistant Examiner—Kurt Rowan
Attorney, Agent, or Firm—F. Brice Faller

[57] ABSTRACT

A fish hook holder comprises a base member having a first planar surface with a series of flat recesses therein which open to a first edge of said base. A cover is bonded to said base to form hook retaining compartments in said recesses, the hooks fitting snugly between the floors of the respective recesses and the cover and being retained by resilient nubs extending above the floors. A protected line severing blade may be provided in one end of the holder which is shaped like a fish for convenience in packaging and use.

6 Claims, 3 Drawing Figures

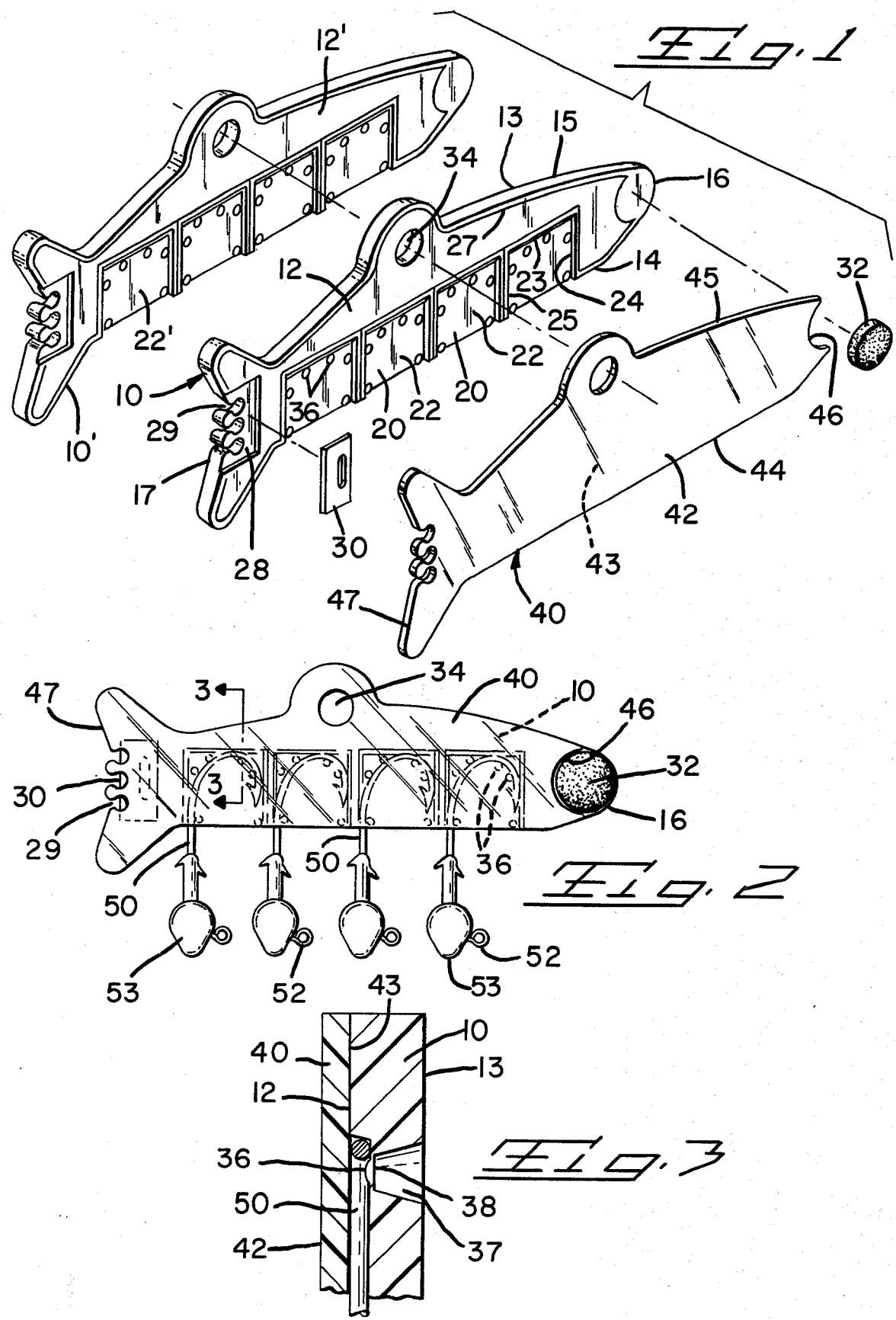

FISH HOOK HOLDER

BACKGROUND OF THE INVENTION

The present invention relates to a holder for fish hooks, and particularly to a holder suitable for displaying, protecting, and dispensing the hooks.

Conventional packages for fish hooks generally have a compartment for loose piece hooks, or the hooks are attached to cardboard by slits therein and the package shrink wrapped in transparent plastic. Similar packaging is also used for simple jig type lures having a lead weight fixed to the eye end of a hook; such packages afford little protection for the pointed end of the hook, which must be kept quite sharp for effective hooking of a fish. Stones for sharpening hooks are discrete items in the fisherman's tackle box, as is a knife or other blade for severing fishing line.

SUMMARY OF THE INVENTION

The instant invention is directed to an attractive package for fish hooks or simple jigs which keeps the hooks arranged for easy release from compartments which guard the arcuate or hooked end of the hooks. The package, hereinafter referred to as a fish hook holder, has compartments formed between a recess in a base and a flat cover, the compartments receiving the hooks quite closely and having resilient nubs therein which provide interference fit for the hooks to retain them therein and also permit reuseability. The holder also incorporates a novel line severing blade which is sandwiched between the base and cover and exposed by arcuate recesses sufficiently to sever a fishing line without permitting entry of the angler's fingers. A stone is also to be provided on the package for the meticulous angler who realizes importance of a sharp hook.

It is a principal object of the invention to incorporate the above features in an attractive yet highly functional package which will catch the eye of the angler in a tackle shop.

BRIEF DESCRIPTION OF THE DRAWINGS

FIG. 1 is an exploded perspective of the fish hook holder of the present invention in modular form.

FIG. 2 is a plan view of the fish hook holder with hooks retained therein.

FIG. 3 is a cross section of a hook retaining compartment taken along line 3—3 of FIG. 2.

DETAILED DESCRIPTION OF THE PREFERRED EMBODIMENT

FIG. 1 illustrates the fish hook holder in perspective with the base 10 exploded from the cover 40 prior to assembly. The base 10 is generally elongate and is bounded by first and second side edges 14, 15 and first and second ends 16, 17. The base has opposed first and second surfaces 12, 13 which are substantially planar and parallel. The first surface has a plurality of recesses 20 therein having flat floors 22, parallel to first surface 12, which are bounded by first and second sidewalls 24, 25 and endwall 23. Each floor 22 has a number of nubs 36 extending therefrom which serve to retain and position the fish hooks as will be described. A flat recess 28 toward second end 17 serves to receive razor blade 30 so it is flush with first surface 12.

Referring still to FIG. 1, the fish hook holder of the present invention is assembled by placing blade 30 in recess 29 and bonding cover 40 to base 10. The cover 40 has opposed first and second planar surfaces 42, 43 respectively, second surface 43 being bonded to first surface 12 of the base 10. This may be done by gluing but more conveniently in mass production by ultrasonic bonding. The base 10 and cover 40 are made of plastic and a thin ridge 27 is molded on first surface 12 to provide a medium for bonding when the base and cover are placed together. An abrasive stone 32 is glued to the first surface 12 toward first end 16, the cover 40 being recessed at first end 46 so the stone 32 will be exposed. A second base member 10' is shown to illustrate the modular nature of the invention; additional hook holding compartments may be created by simply bonding first surface 12' of base 10' to second surface 13 of base 10.

FIG. 2 shows an assembled hook holder with hooks 50 therein. The hooks have been inserted into the holder by pushing each hook 50 into recess 20 between the floor 22 thereof and cover 40 until the arcuate end 51 snaps over one or more of the nubs 36. Six nubs are molded in each recess 20 in this embodiment; the hook snaps over three of them in an interference fit. The nubs 36 are arranged so that a hook can be retained and positioned in a recess 20 in either of two orientations. Note that blade 30 is exposed only in arcuate recesses 29 at second ends 17, 47 of the base 10 and cover 40 respectively; this is a safety feature which permits severing a filament without endangering the user's fingers. A hole 34 is provided through base 10 and cover 40 which is positioned so that the hooks will lie in a horizontal line when the holder is hung by the hole 34 for display.

FIG. 3 details an important feature of the invention, the structure of the nubs 36. The floor 22 is spaced from the second surface 43 by a distance which closely accommodates a hook 50. Nubs 36 protrude above the floor 22 so that the hook 50 may only be inserted in an interference fit. To prevent shearing the nub 36, a dimple 37 is molded in second surface 13 which leaves only a thin button-like web 38 of material forming the nub 36. This is designed so that the web 38 will flex resiliently into dimple 37 as a hook is inserted, additional resilience being provided by the cover 40 and base 10, which flex apart slightly. This feature permits replacing the hook after use to protect it from damage and provide safe storage.

The overall profile of the holder is that of a fish, which in addition to enhancing display value, provides for convenience and aesthetic placement of the blade 30 and stone 32 on an elongate holder which may be easily grasped by the angler during use. The base 10 is preferably molded of an opaque plastic while the cover 40 is transparent. The second surface 13 or 13' provides a convenience place for advertising or instructions.

The above described embodiment is exemplary and not intended to limit the scope of the claims which follow.

I claim:

1. A holder for fish hooks which comprises a substantially planar first base having a substantially planar first surface, an opposed substantially planar second surface, and opposed first and second side edges, said first surface having a plurality of first recesses therein, each said recess having a substantially planar floor which is parallel to said first planar surface at a certain distance therebelow, each said recess communicating with said first side edge, each said recess being bounded by an endwall opposite said first side edge and opposed first and second sidewalls which extend between said endwall and said first side edge, said holder having means for retaining the arcuate end of a fish hook in each recess, a substantially planar cover having a first planar surface and an opposed second planar surface, said second planar surface being adhered to said first planar surface of said base, each recess being open only at said first edge of said base, said fish hook holder being substantially elongate, said holder having a first end and an opposed second end, said first and second side edges extending therebetween, said base and said cover having like profiled edges proximate said second end, said holder further comprising a razor blade sandwiched between said first surface of said base and said second surface of said cover, said blade having a sharp edge which extends beyond said end edges of said cover and base.

2. The fish hook holder of claim 1 wherein said cover and said base are plastic and said first surface of said base has a fine ridge thereon, said ridge facilitating ultrasonic bonding of said first surface of said base to said second surface of said cover.

3. The fish hook holder of claim 1 wherein said end edges are scalloped to form at least one arcuate recess, said sharp edge of said blade being exposed in said recess.

4. The fish hook holder of claim 1 wherein said base is profiled with a second recess proximate said second end, said second recess being profiled to accommodate said blade so it is flush with said first surface of said base.

5. The fish hook holder of claim 1 wherein said holder is substantially elongate, said holder having a first end and an opposed second end, said first and second side edges extending therebetween, said base extending beyond said cover proximate said second end thereby exposing said first surface of said base proximate said first end, said fish hook holder further comprising an abrasive wafer adhered to said exposed portion of said first surface, said abrasive providing convenient means for sharpening a fish hook.

6. The fish hook holder of claim 1 which further comprises a second base member identical to said first base member, said first planar surface of said second base member being adhered to said second planar surface of said first base member whereby said recesses in said second base member provide additional hook retaining capacity.

* * * * *